May 22, 1956  J. T. GONDEK  2,746,579
STRUCTURAL JOINTS
Filed Nov. 9, 1951

INVENTOR
John T. Gondek
BY Robert M. Dunning
ATTORNEY

United States Patent Office 2,746,579
Patented May 22, 1956

2,746,579

STRUCTURAL JOINTS

John T. Gondek, Minneapolis, Minn.

Application November 9, 1951, Serial No. 255,682

1 Claim. (Cl. 189—36)

My invention relates to in improvement in structural joints and deals particularly with a means of producing a firmer connection between connected parts.

When two parts are riveted, bolted, screwed or pinned together and then are subjected to a strain, there is a tendency for the connecting element to shear or for the holes accommodating the connecting elements to become enlarged. This tendency is created by the strain tending to produce relative movement between the connected parts. The present invention deals particularly with a method and means of reducing this tendency for the connected parts to move relative to one another, thereby avoiding previous difficulties.

An object of the present invention lies in the method of producing a joint between two parts which includes the step of placing a series of small relatively hard particles between the two surfaces to be fastened together before the fastening operation. These parts are harder than the material of the parts being secured together. As a result when the two parts are fastened together the particles embed themselves in the two pieces fastened together and thereby provide a means of holding the parts from relative movement or rotation.

A further object of the present invention resides in the provision of a structural joint in which the parts being connected have a series of particles such as spherical balls of appropriate size therebetween embedded into the material of the connected parts. These particles are harder than the material of the parts being connected so as to permit the embedding action.

A feature of the present invention resides in the provision of particles between the surfaces of two or more parts being connected together by riveting, bolting, or the like, and in thus decreasing the tendency of one connected part to move relative to one or more other parts. As some of the embedded particles will be spaced a substantial distance from the axis of each bolt or rivet, the tendency for the two parts to pivot about the axis of the pivot or bolt is effectively decreased. In other words, the particles act to form an inner connection between the parts at a considerable distance from the axis of the connecting pivot or bolt and thereby greatly decrease the tendency for relative pivotal movement between the parts, even when only one fastener is used per joint.

A further feature of the present invention relates to the manner in which the preferably spherical particles may be applied in place. An indented or pocketed drum may pick up the tiny spheres from a suitable hopper. The properly spaced spheres may then be applied in spaced relation to a carrying web having an adhesive coated surface. The web supporting the spheres may then be placed between the surfaces to be connected. The spheres become embedded substantially equally in both surfaces as these surfaces are compressed together.

These and other objects and novel features of my invention will be more clearly and fully set forth in the following specification and claim.

In the drawings forming a part of my specification:

Figure 1:
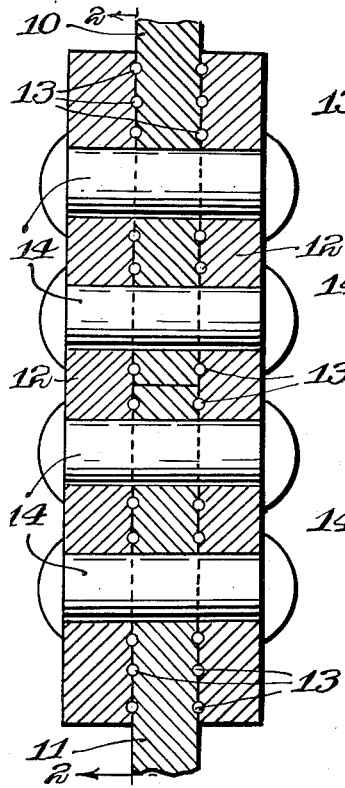
Figure 1 is a cross-sectional view through a riveted joint showing the relationship of parts therein.
Figure 2:
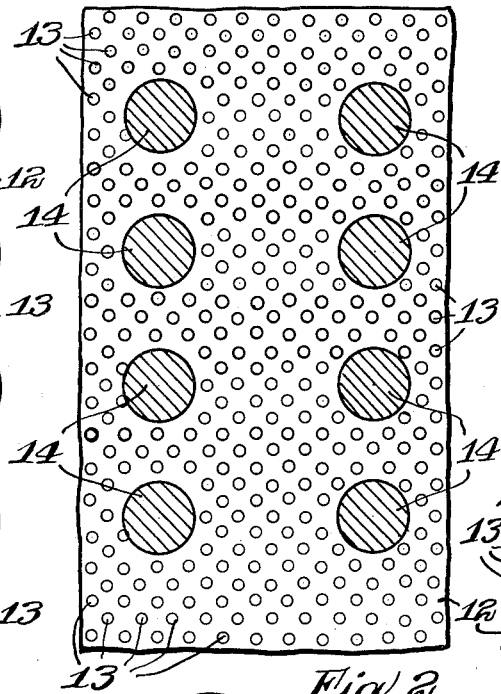
Figure 2 is a sectional view through the connection of Figure 1, the position of the section being indicated by the line 2—2 of Figure 1.
Figure 3:
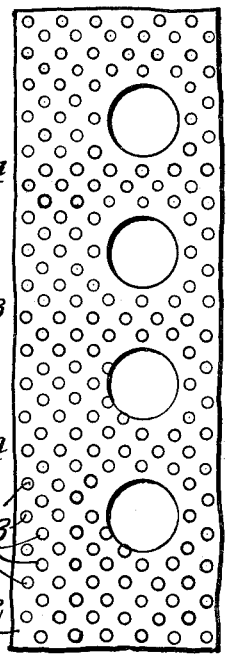
Figure 3 is an elevational view of one of the parts to be connected showing the manner in which the particles may be embedded therein.

The drawings illustrate a pair of members 10 and 11 which are to be connected together by means of straps or plates 12 which overlie the butt joint between the members 10 and 11 and which are riveted or otherwise connected to both of the members 10 and 11. The connecting members 12 may be of substantial width or may comprise narrow straps or strips. Alternatively, the members 10 and 11 could be merely overlapped and connected.

Before the members 12 are applied to the marginal surfaces of the members 10 and 11, particles 13, such as spherical balls of proper dimension are inserted between the contacting surfaces. One series of particles 13 are provided between the parts 10 and 11 and the member 12 overlying one surface of these parts and another series of particles 13 are applied between the opposite surface of the parts 10 and 11 and the opposite member 12. These particles 13 are small in size and comprise hard spheres or granules of material of any suitable type. For example small spheres of steel may be employed where the members connected are of softer metal. Particles of flint or other abrasive material may be used, but irregular particles of this type are less effective and less desirable. It is important to the invention that the particles embed themselves to some extent into the members 10, 11 and 12 so as to produce the desired result. Spherical particles have been found most effective for the purpose.

As indicated a series of rivets 14 extend through the members 3 and the marginal edges of the parts 10 and 11. These rivets are applied in the usual manner, being preferably inserted in a heated condition and riveted over by means of a riveting gun or the like. In the riveting operation force is applied to the surfaces of the members so as to tend to compress the connected parts together. This action causes the particles to become embedded between the surfaces of the connected parts in the manner illustrated.

When the particles 13 are embedded as shown in Figure 1, the particles greatly aid the rivets 14 in holding the parts from relative movement as, they too, are in shear. If the particles are partially embedded in both contacting surfaces a force tending to move one part relative to another is opposed by these interengaging particles as well as by the rivets. Thus as long as the rivets themselves hold the parts in close surface contact, there is little likelihood of relative movement between the parts in any direction.

The particles not only tend to resist sliding movement between the two parts, but also pivotal movement between the parts. Obviously the inter-engagement between the surfaces created by the embedding of the particles tends to prevent relative pivotal movement between the connected parts, particularly in view of the distance of this inter-engagement from the axis of pivot. A relatively small force tending to hold the parts from relative rotation located at a substantial distance from the axis of pivotal movement is the equivalent of a much larger force near the axis of pivot. Thus relative movement between the connected parts in any direction is prevented by the particles.

Figure 4:
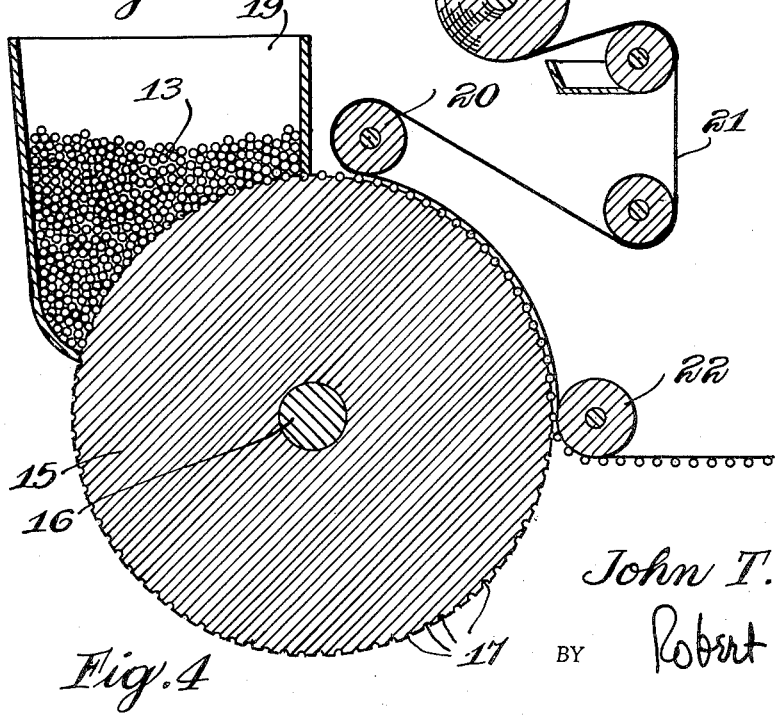
Figure 4 illustrates diagrammatically the manner in which the particles may be mounted for application.

A convenient manner of placing the spheres between the surfaces being fastened together is indicated in Figure 4 of the drawings. In this figure, I disclose a drum 15 rotatably supported upon a suitable shaft 16 and having spaced pockets 17 in its periphery. These pockets 17 comprise indentations which may be aligned as indicated in the various drawings or may be arranged in off-set rows so that the pockets of alternate rows are off-set from the remaining rows. This drum rotates beneath the hopper 19 which is designed to support a series of the spheres 13. The spheres 13 may vary in size according to the material with which they are to be used. In fastening surfaces of beams and the like together, the spheres may be minute balls of hardened metal similar to extremely small shot or balls for ball bearings. In fastening softer materials together, such as wooden beams and the like, relatively large balls are used and the hardness of the balls may be correspondingly reduced.

As the drum 15 rotates past the hopper 19, spheres contact the surface of the drum and drop into the various pockets 17. Thus as the drum rotates from beneath the hopper virtually all of the pockets have the balls located therein. Further rotation of the drum carries the balls beneath a roller 20. This roller supports a sheet or tape 21 having an adhesively coated surface opposite the surface contacting the roller 20. A second roller 22 is provided located around the periphery of the drum 15. The sheet or tape 21 is curved by contact with the balls 13 in the pockets of the drum 15 between the rollers 21 and 22. The adhesive of the sheet picks up the spheres 13 and provides a carrying sheet having the sphere 13 in properly spaced relation. The adhesive used on the sheet or tape may be either of a glue type or may be a pressure sensitive type.

The sheet 21 having the spheres 13 located thereon is placed between the parts to be connected together much in the same way that a gasket is secured between fastened parts. The manner in which the sheet is applied in place is not important in the present invention. The back of the sheet may be adhesively secured to one of the members to be connected or the sheet may be merely interposed between the parts as they are brought together.

The portion of the sheet overlying the rivet holes or bolt holes is readily punched out by insertion of the rivet or bolt through the openings, or previously formed apertured sheets may be used when the number of joints being made is great enough to warrant the die cutting.

As the two elements being fastened together are squeezed together under pressure, the relatively fragile tape or sheet 21 fractures and the balls or spheres become equally embedded in both of the parts being fastened together.

In accordance with the patent statutes, I have described the principles of construction and operation of my anchored joints, and while I have endeavored to set forth the best embodiment thereof, I desire to have it understood that obvious changes may be made within the scope of the following claim without departing from the spirit of my invention.

I claim:

A joint connecting two parts including fastening means about which the parts tend to pivot holding the parts in substantial surface contact, pivotal motion of said parts being resisted by the interposition between said parts of a fragile, readily fracturable sheet supporting on a surface thereof, spaced, substantially spherical elements which are partially embedded in the facing surfaces of said parts and are of a material which is hard relative to the hardness of the parts, said sheet having been fractured by said elements upon tightening of said fastening means whereby said elements extend through said sheet and partially on either side of said sheet and said partial embedding in each of said parts is obtained.

References Cited in the file of this patent

UNITED STATES PATENTS 969,449   Blake _____ Sept. 6, 1910

OTHER REFERENCES

Mechanical Engineering, issue of November 1939, pages 796–798.